United States Patent
Grgic et al.

(10) Patent No.: US 7,899,559 B2
(45) Date of Patent: Mar. 1, 2011

(54) LANGUAGE-BASED ORGANIZATION OF CONTROLLER ENGINE INSTANCES

(75) Inventors: Richard J. Grgic, Painsville, OH (US); Subbian Govindaraj, Solon, OH (US); Kenwood H. Hall, Hudson, OH (US); Robert J. Kretschmann, Bay Village, OH (US); Charles M. Rischar, Chardon, OH (US); Raymond J. Staron, Chagrin Falls, OH (US); David A. Vasko, Solon, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 262 days.

(21) Appl. No.: 11/733,390

(22) Filed: Apr. 10, 2007

(65) Prior Publication Data

US 2008/0208364 A1  Aug. 28, 2008

Related U.S. Application Data

(63) Continuation-in-part of application No. 11/679,380, filed on Feb. 27, 2007, and a continuation-in-part of application No. 11/679,394, filed on Feb. 27, 2007.

(51) Int. Cl.
  *G05F 11/01* (2006.01)
  *G06F 15/16* (2006.01)
(52) U.S. Cl. .............. 700/20; 700/2; 700/11; 700/113; 709/201
(58) Field of Classification Search ............... 700/2, 11, 700/20, 113
See application file for complete search history.

(56) References Cited

U.S. PATENT DOCUMENTS

| | | | |
|---|---|---|---|
| 5,142,469 A | | 8/1992 | Weisenborn |
| 5,796,603 A | | 8/1998 | Hodorowski |
| 5,826,244 A | | 10/1998 | Huberman |
| 5,875,461 A | * | 2/1999 | Lindholm ............ 711/118 |
| 5,887,029 A | | 3/1999 | Husted et al. |
| 5,949,674 A | | 9/1999 | Song et al. |
| 5,970,243 A | * | 10/1999 | Klein et al. ............ 717/113 |
| 5,971,581 A | | 10/1999 | Gretta et al. |
| 6,055,370 A | * | 4/2000 | Brown et al. ............ 717/142 |
| 6,268,853 B1 | | 7/2001 | Hoskings et al. |
| 6,338,130 B1 | | 1/2002 | Sinibaldi |
| 6,373,836 B1 | | 4/2002 | Deryugin et al. |
| 6,453,460 B1 | | 9/2002 | Keyes |
| 6,615,092 B2 | | 9/2003 | Bickley et al. |
| 6,735,764 B2 | | 5/2004 | Nakai |
| 6,816,746 B2 | | 11/2004 | Bickley et al. |
| 6,882,890 B2 | | 4/2005 | Horn et al. |

(Continued)

OTHER PUBLICATIONS

OA dated Apr. 1, 2009 for U.S. Appl. No. 11/738,787, 32 pages.

(Continued)

*Primary Examiner* — Albert Decady
*Assistant Examiner* — Olvin Lopez
(74) *Attorney, Agent, or Firm* — Turocy & Watson LLP; R. Scott Speroff; John M. Miller

(57) ABSTRACT

The claimed subject matter provides a system and/or method that facilitates utilizing multiple computer languages within an industrial environment. A controller can execute with a real-time operating system such that the controller can include two or more controller engine instances executing as processes on the controller. A language isolation component can organize one or more controller engine instances based upon a computer language utilized within the industrial environment.

14 Claims, 12 Drawing Sheets

U.S. PATENT DOCUMENTS

| | | | |
|---|---|---|---|
| 6,901,446 | B2 | 5/2005 | Chellis et al. |
| 6,922,681 | B2 | 7/2005 | Fromherz et al. |
| 6,947,798 | B2 | 9/2005 | Bronikowski et al. |
| 7,039,740 | B2 | 5/2006 | Glasco et al. |
| 7,065,714 | B1 | 6/2006 | Theel et al. |
| 7,139,618 | B2 | 11/2006 | Danz et al. |
| 7,257,620 | B2 | 8/2007 | Lo |
| 7,272,815 | B1 | 9/2007 | Eldridge et al. |
| 7,374,524 | B2 * | 5/2008 | McCormick .................. 483/4 |
| 7,472,387 | B2 | 12/2008 | Nakano |
| 2002/0129085 | A1 * | 9/2002 | Kubala et al. .................. 709/104 |
| 2002/0194417 | A1 | 12/2002 | Suzuki et al. |
| 2003/0163508 | A1 | 8/2003 | Goodman |
| 2004/0117535 | A1 | 6/2004 | Schaftlein |
| 2004/0260408 | A1 * | 12/2004 | Scott et al. .................. 700/20 |
| 2005/0028137 | A1 | 2/2005 | Evans et al. |
| 2005/0202808 | A1 | 9/2005 | Fishman et al. |
| 2006/0005171 | A1 | 1/2006 | Ellison |
| 2006/0041328 | A1 * | 2/2006 | McCormick .................. 700/179 |
| 2006/0092861 | A1 | 5/2006 | Corday et al. |
| 2006/0150174 | A1 | 7/2006 | Abe et al. |
| 2006/0178757 | A1 | 8/2006 | Grgic et al. |
| 2006/0200257 | A1 | 9/2006 | Kirste et al. |
| 2007/0044066 | A1 * | 2/2007 | Meijer et al. .................. 717/100 |
| 2007/0173959 | A1 | 7/2007 | Chandhoke |
| 2008/0066019 | A1 * | 3/2008 | Worek et al. .................. 715/965 |
| 2008/0090586 | A1 * | 4/2008 | Engelhart .................. 455/456.1 |
| 2008/0109471 | A1 * | 5/2008 | Subbian et al. .................. 707/102 |
| 2008/0125877 | A1 | 5/2008 | Miller et al. |

OTHER PUBLICATIONS

OA mailed Feb. 25, 2009 for U.S. Appl. No. 11/686,406, 29 pages.
OA mailed Mar. 20, 2009 for U.S. Appl. No. 11/679,394, 37 pages.
OA mailed Mar. 9, 2009 for U.S. Appl. No. 11/695,758, 33 pages.
OA mailed Mar. 19, 2009 for U.S. Appl. No. 11/733,357, 34 pages.
OA mailed Mar. 20, 2009 for U.S. Appl. No. 11/679,380, 41 pages.
OA dated Oct. 7, 2009 for U.S. Appl. No. 11/679,380, 38 pages.
OA dated Aug. 20, 2009 for U.S. Appl. No. 11/686,406, 31 pages.
OA dated Oct. 19, 2009 for U.S. Appl. No. 11/695,758, 32 pages.
OA dated Aug. 18, 2009 for U.S. Appl. No. 11/738,784, 38 pages.
OA dated Oct. 2, 2009 for U.S. Appl. No. 11/738,787, 22 pages.
OA dated Oct. 19, 2009 for U.S. Appl. No. 11/733,357, 38 pages.
Foley. "Modify MicroLogix Online." Feb. 2006, A-B Journal, vol. 13, No. 1, abstract, pp. 1-2.
Johnson, et al. "OS Partitioning for EMbedded SYstems" Feb. 2, 2006; QNX Software Systems, pp. 1-9.
Johnson. Lowering the Development Costsof Industrial Control Systems through Software Partioning. Aug. 15, 2006; QNX Software Systems, pp. 1-9.
OA dated Feb. 22, 2010 for U.S. Appl. No. 11/738,787, 35 pages.
OA dated Feb. 23, 2010 for U.S. Appl. No. 11/738,784, 35 pages.
Office Action dated May 24, 2010 for U.S. Appl. No. 11/695,727, 37 pages.
Office Action dated Jun. 24, 2010 for U.S. Appl. No. 11/745,023, 51 pages.
Office Action dated Jun. 3, 2010 for U.S. Appl. No. 11/695,758, 54 pages.
Hardin, Davis S; "Crafting a JAVA Virtual Machin in Silicon"; Mar. 2001; IEEE Xplore; IEEE Instrumatation & Measurement Magazine; pp. 54-56.
Hassapis, George; "Sift-testing of industrial control systems programmed in IEC 1131-3 languages"; 2000; ISA Transactions vol. 39 pp. 345-355.

* cited by examiner

LANGUAGE-BASED ORGANIZATION OF CONTROLLER ENGINE INSTANCES

CROSS REFERENCE TO RELATED APPLICATION(S)

This continuation-in-part application claims the benefit of U.S. patent application Ser. No. 11/679,380 filed on Feb. 27, 2007, entitled "CONSTRUCTION OF AN INDUSTRIAL CONTROL SYSTEM USING MULTIPLE INSTANCES OF INDUSTRIAL CONTROL ENGINES" and U.S. patent application Ser. No. 11/679,394 filed on Feb. 27, 2007, entitled "DYNAMIC LOAD BALANCING USING VIRTUAL CONTROLLER INSTANCES." The entireties of such applications are incorporated herein by reference.

TECHNICAL FIELD

The claimed subject matter relates generally to hardware controllers within an industrial automation environment and, more particularly, to optimize the execution of such hardware controllers.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases that are accessible by system/process/project managers on a factory floor. For instance, sensors and associated software can detect a number of instances that a particular machine has completed an operation given a defined amount of time. Further, data from sensors can be delivered to a processing unit relating to system alarms. Thus, a factory automation system can review collected data and automatically and/or semi-automatically schedule maintenance of a device, replacement of a device, and other various procedures that relate to automating a process.

While various advancements have been made with respect to automating an industrial process, utilization and design of controllers have been largely unchanged. In more detail, industrial controllers have been designed to efficiently undertake real-time control. For instance, conventional industrial controllers receive data from sensors and, based upon the received data, control an actuator, drive, or the like. These controllers recognize a source and/or destination of the data by way of a symbol and/or address associated with source and/or destination. More particularly, industrial controllers include communications ports and/or adaptors, and sensors, actuators, drives, and the like are communicatively coupled to such ports/adaptors. Thus, a controller can recognize device identity when data is received and further deliver control data to an appropriate device.

Unfortunately, traditional controllers employed within automation industrial environments have fallen behind recent technological advances to which the automation industry has maintained stride for stride. Conventional controllers are rigid and inflexible such that hardware and/or software associated therewith must be specifically tailored to a particular control engine and a one-to-one ratio between controllers and control engines must be maintained. With the vast number of controllers and/or control engines within industrial environments and each having respective code/data in particular languages, management of the industrial environment can be an overwhelming and time-consuming task. Moreover, conventional techniques and/or mechanisms for managing devices, controllers, applications, software, components, control engines, processes, data/code, and the like tend to be restrictive in that data/code manipulations cannot be independent from affecting the entire industrial environment.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The subject innovation relates to systems and/or methods that facilitate organizing an industrial environment and controller engine instances based at least in part upon a computer language. A language isolation component can identify a plurality of languages associated with an industrial environment to base the organization of groups and/or units. The language isolation component can generate groups and/or units within the industrial environment, wherein such membership to each group requires the employment of a particular language. In other words, the language isolation component can create language-based groups within the industrial environment and/or controller engine instances such that each member of the group utilizes a specific language.

The language isolation component can further allow each group and/or unit to be sand-boxed from one another to ensure separate and distinct execution space. Thus, data within the industrial environment pertaining to a first computer language can be isolated from data within the industrial environment pertaining to a second computer language based on the language-based groups and/or units created by the language isolation component. The isolation component can separate controller engine instances based upon language to enable an information technology (IT) language to coexist with a control language with the knowledge that the IT language may not interfere with the control language. In other aspects of the claimed subject matter, methods are provided that facilitate organizing an industrial environment and controller engine instances based on computer language.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed and such subject matter is intended to include all such aspects and their equivalents. Other advantages and novel features will become

DETAILED DESCRIPTION

Figure 1:
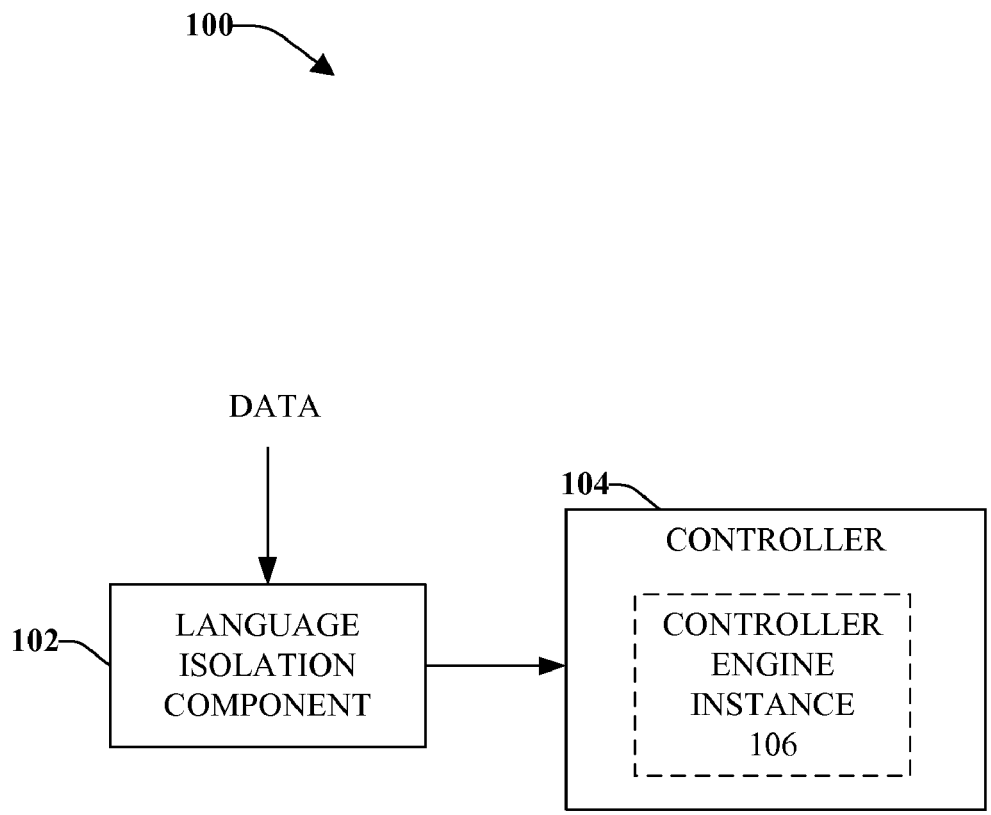
FIG. 1 illustrates a block diagram of an exemplary system that facilitates organizing an industrial environment and controller engine instances based at least in part upon a computer language.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component," "controller," and "system" are intended to refer to a computer-related entity, either hardware, a combination of hardware and software, software, or software in execution. For example, a component may be, but is not limited to a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Now referring to the drawings, FIG. 1 illustrates a system 100 that facilitates organizing an industrial environment and controller engine instances based at least in part upon a computer language. The system 100 can include a language isolation component 102 that can divide and/or segment a controller engine instance 106 hosted by a controller 104 within an industrial environment based at least in part upon a language associated therewith. The industrial environment and/or the controller engine instance 106 can handle and/or control a portion of a load, device, process, application, etc. by utilizing various computer languages, application languages, programming languages, and the like. The language isolation component 102 allows segregation of the industrial environment and the controller engine instances into language-based groups and/or units. In particular, the language isolation component 102 can receive data related to the computer languages, application languages, programming languages, etc. in order to isolate controller engine instances from one another based on such languages. It is to be appreciated that most any suitable language can be utilized by the controller 104, the controller engine instance 106, the industrial environment, and/or the system 100. For example, a first control engine instance can control the process utilizing a control language and a second control engine instance running a model of the process utilizing a modeling language (e.g., a test language, a preliminary language, etc.).

For example, the language isolation component 102 can organize the controller engine instance 106 and respective data/loads, wherein the language employed by such data/loads can be the basis for organization. The languages can be most any suitable language (e.g., high level language, low level language, execution blocks, assembly code, machine instructions, etc.) such as, but not limited to, C, C+, C++, C#, ADA, PASCAL, FORTRAN, BASIC, Visual Basic, LISP, PROLOG, JAVA, Assembly Programming Language, ALGOL, COBOL, Ladder Logic, Function Blocks, Sequential Function Charts, Structured Text, Instruction Lists, native controller language, Python, a scripting language, a specification language (e.g., formal specification, language-independent specification, etc.), a query language (SQL, XQuery, etc.), a markup language (HTML, etc.), a transformation language (e.g., XSLT, etc.), a template processing language, a fourth-generation programming language (e.g., 4GL, etc.), a hardware description language, a configuration file format (e.g., INI file, etc.), a data serialization format, most any suitable language utilized within an industrial environment related to data associated therewith, etc.

The language isolation component 102 can selectively divide an industrial environment into various sectors, sections, partitions, units, etc., wherein each can include various loads, controllers, controller engine instances, processes, devices, and the like. By creating partitions/sections based on a computer language within an industrial environment, the management of such (e.g., controllers, controller engine instances, devices, processes, applications, controller code/data, controller engine instance code/data, device code/data, process data/code, application data/code, etc.) can be greatly enhanced and optimized. Thus, rather than administrating an entire industrial environment, the language isolation component 102 enables a more manageable industrial environment that is partitioned, scaled, divided, grouped, distributed, allocated, etc. based on computer languages utilized for data.

The language isolation component 102 can further allow each segment and/or partition created based on computer/application language to have dedicated execution space that is separate and independent of other one another. Therefore, each partition and/or unit organized by the language isolation component 102 can include respective space and isolation such that data within one partition/unit can not affect data within a disparate partition/unit. In other words, a member of a partition and/or unit may not disrupt a member of a disparate partition and/or unit. With this isolation, trouble-shooting and other various data manipulations can be employed on smaller increments (e.g., partitions, units, etc.) of an industrial environment. In addition, data manipulations can be isolated to an execution space that includes a particular computer/application language. The isolation component 102 can separate controller engine instances based upon language to enable an information technology (IT) language to coexist with a control language with the knowledge that the IT language may not interfere with the control language. For example, an industrial environment can be segmented into four (4) groups and/or units where each can be designated for a particular computer/application language, wherein unit A is designated for a first language or a set of languages, unit B is designated for a second language or a set of languages, unit C is designated for a third language, and unit D is based on a fourth language. The language isolation component 102 can create units A, B, C and D with respective execution space that can be independent, separate, and distinct from one another. Thus, the industrial environment and included controller engine instances can be organized based on computer/application language to facilitate management and/or administration of such.

It is to be appreciated that the controller 104 can contain software components and hardware components having inputs and/or outputs that can be utilized in connection with automating an industrial manufacturing device/process. Moreover, it is to be appreciated and understood that the controller 104 can be most any suitable portion of hardware and/or portion of software that receives and/or transmits inputs and/or outputs in order to control at least one of a device or a portion of a process. It is to be noted that a controller (e.g., a programmable logic controller (PLC), etc.) can be a dedicated piece of hardware that is self contained or in the case of a "soft PLC" a piece of software that runs on a computer and provides PLC-like control. For instance, in the case of a soft PLC, the soft PLC can be partitioned to employ most any suitable soft PLC engine instances on a real time operating system (e.g., rather than a soft PLC controller executing on an operating system as non-real time), wherein each soft PLC engine instance can handle a portion of what the soft PLC engine handled, controlled, etc.

It is to be noted that the controller 104 can include various computer or network components such as servers, clients, communications modules, mobile computers, wireless components, control components and so forth that are capable of interacting across a network (not shown). Similarly, the term PLC or controller as used herein can include functionality that can be shared across multiple components, systems, and or networks. For example, one or more controllers 104 (e.g., PLCs, etc.) can communicate and cooperate with various network devices across a network. This can include substantially any type of control, communications module, computer, I/O device, sensor, Human Machine Interface (HMI)) that communicate via a network which includes control, automation, and/or public networks. The controller 104 can also communicate to and control various other devices such as Input/Output modules including Analog, Digital, Programmed/Intelligent I/O modules, other programmable controllers, communications modules, sensors, output devices, and the like.

A network can include public networks such as the Internet, Intranets, and automation networks such as Common Industrial Protocol (CIP) networks including DeviceNet, ControlNet and EtherNet/IP. Other networks include Ethernet, DH/DH+, Remote I/O, Foundation Fieldbus, Fieldbus, Modbus, Profibus, wireless networks, serial protocols, and so forth. In addition, the network devices can include various possibilities (e.g., hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

In another aspect in accordance with the subject innovation, the controller 104 can be implemented in the industrial automation environment (e.g., an industrial environment, an automation environment, an environment, an automation industry, etc.) which employs a hierarchical representation of devices and/or processes. The hierarchy can be based at least in part upon the physical location of devices/processes (e.g., a region of a factory can have several defined sub-regions, which in turn can comprise sub-regions), standards associated with industry, such as ISA S95, ISA S88, and the like, proprietary hierarchy that is provided by an enterprise, or any other suitable hierarchy (discussed in further detail in FIG. 10). It is to be appreciated that the controller software can be distributed as a component of a disparate application (e.g., a larger application). For instance, a controller component can be included on a welder (e.g., a robot welder, an automated welder, etc.), wherein the controller can execute within the context of the welder (e.g., executing within the context of the robot welder). Moreover, the proprietary standard can include customer defined hierarchies as well as industrial automation company defined hierarchies (e.g., a company can provide tools to which customers can define their own hierarchies).

Figure 2:
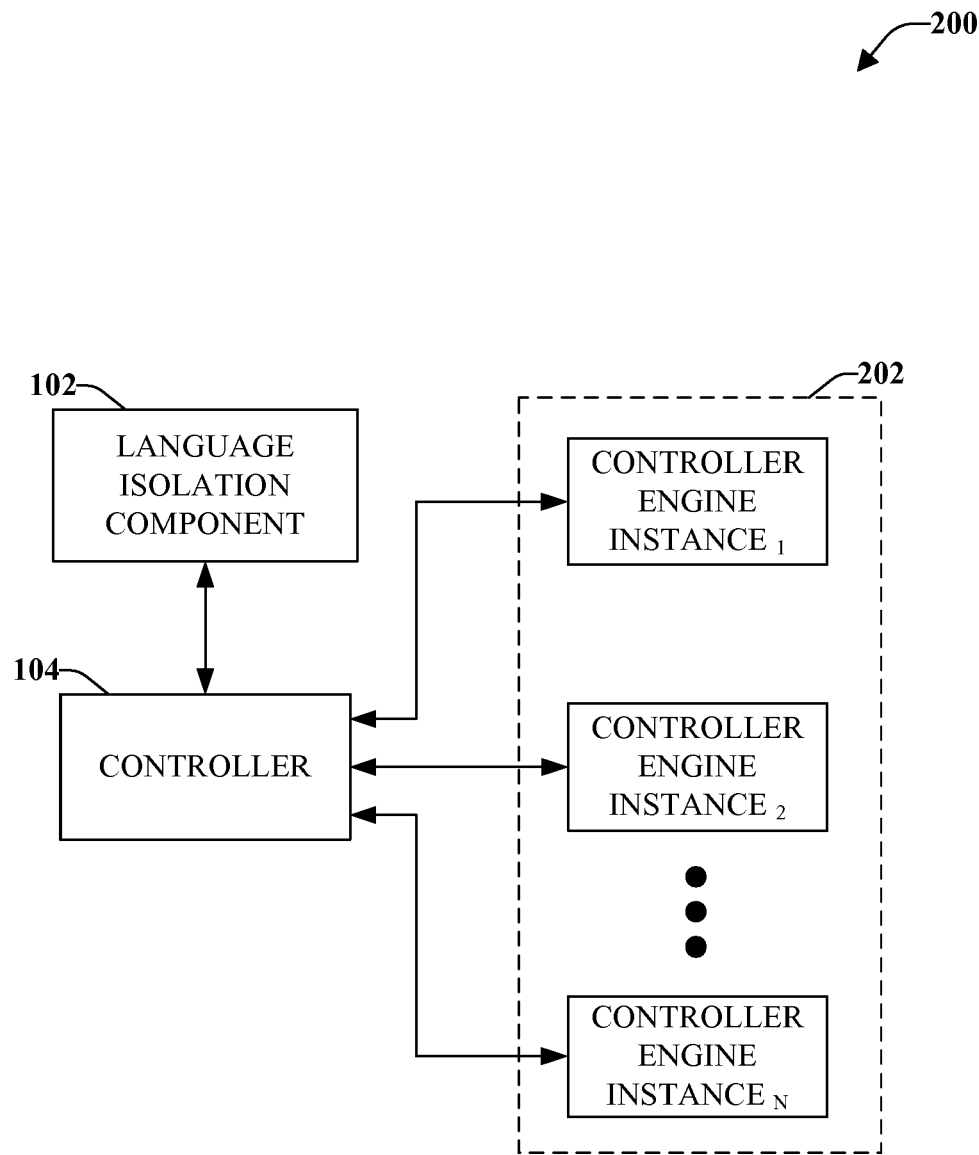
FIG. 2 illustrates a block diagram of an exemplary system that facilitates employing one or more controller engine instances related to a controller and organizing such controller engine instances.

FIG. 2 illustrates a system 200 that facilitates employing one or more controller engine instances related to a controller and organizing such controller engine instances. The system 200 can include the controller 104 that can generate at least one controller engine instance 202, wherein the controller engine instance 202 can execute on the controller 104 with a real time operating system (OS) to be utilized with automating/controlling an industrial manufacturing device and/or process. It is to be appreciated most any suitable operating system can be utilized by the subject innovation (e.g., a proprietary operating system, off-the-shelf, a third-party operating system, an open source operating system, a real time operating system (OS), etc.). The controller 104 can utilize most any suitable number of controller engine instances 202 such as controller engine instance $_1$ to controller engine instance $_N$, where N is a positive integer. In other words, the controller 104 can implement a plurality of controller engine instances 202, wherein each controller engine instance can handle controlling a device and/or portion of a process within an industrial automation environment. It is to be appreciated that the system 200 can enable the creation of a new instance of an engine based on a set of pre-defined parameters. In other words, no user intervention is needed to start a new instance of the engine.

For example, an industrial automation environment can include a controller that can be utilized with a first process, a second process, and a device. Conventionally, a controller and a controller engine are restricted to a one-to-one ratio such that there is only one controller engine per physical hardware controller. With such restrictions, additional hardware controllers needed to be introduced to enable multiple controller engines. However, the claimed subject matter implements a controller engine in a substantially similar manner to a process implemented on a hardware controller in the fact that multiple controller engines (e.g., controller engine instance) can execute on the hardware controller (e.g., multiple processes can execute on a controller). By executing multiple controller engine instances on the controller, each particular controller engine instance can handle at least a portion of a process and/or a device within the industrial automation environment. For instance, the controller can employ a controller engine instance to handle the first process, a controller engine instance to control the second process, and/or a controller engine instance to handle/control the device. It is to be appreciated that the controller can implement most any suitable number of controller engine instances. In another example, a first controller engine instance can be utilized for the first process and the second process while a disparate controller engine instance can be utilized for the device. In other words, the various number of controller engine instances can be managed to control, handle, and/or execute a device and/or process in most any suitable combination.

In another example, an industrial automation environment can include controller A, controller B, and controller C. In one scenario, controller engine instances can execute on a corresponding parent/host controller. However, there can be distributed controller engine instances (e.g., a controller engine instance with more than one host and/or parent controller) such that more than one controller can handle and/or host a controller engine instance. Thus, controller A and controller B can share the hosting duties for a controller engine instance. By sharing and/or distributing the execution of the controller engine instance to more than one controller, the full potential of controllers and respective controller engine instances can be reached.

In another example, a controller engine instance executing on a first controller can be seamlessly handed off to a disparate controller based upon a deterioration of the initial hosting controller (e.g., first controller). Furthermore, the controller engine instance can be shared and/or distributed to a disparate controller in light of a possible deterioration and/or problematic initial host controller. It is to be appreciated that the claimed subject matter is to include transferring, handing off, sharing, etc. of a controller engine instance to a disparate controller based on a particular event/circumstance (e.g., controller health, controller characteristic, restructure, update, security, upgrade, error, firmware, dependability, detail related to an industrial automation environment, etc.). It is to be appreciated that the system 200 can enable the creation of controller engine instances without user intervention. Thus, the creation and/or generation of the controller engine instances to execute on the real time operating system (OS) corresponding to the controller can be automatic and seamless.

As discussed, the language isolation component 102 can generate groupings and/or units based upon computer/application language utilized by the controller engine instances and/or respective loads in connection with the industrial environment. The language isolation component 102 can evaluate controllers, controller engine instances, devices, applications, processes, etc. within an industrial environment to ascertain languages utilized therewith in order to base the organization and/or creation of groupings and/or units. For instance, an industrial environment can include controller A and controller B, with controller A hosting controller engine instance 1 and controller engine instance 2 and controller B hosting controller engine instance 3 and controller engine instance 4. Conventionally, the entire industrial environment would be managed altogether (e.g., controller A, controller B, controller engine instance 1, controller engine instance 2, controller engine instance 3, controller engine instance 4, data related to controllers, data related to controller engine instances, etc.). However, the language isolation component 102 can generate a language-based segmentation and/or division for granular management rather than managing the environment as a whole (e.g., language A to controller engine instance 1 and controller engine instance 2, language B to controller engine instance 4, etc.).

Figure 3:
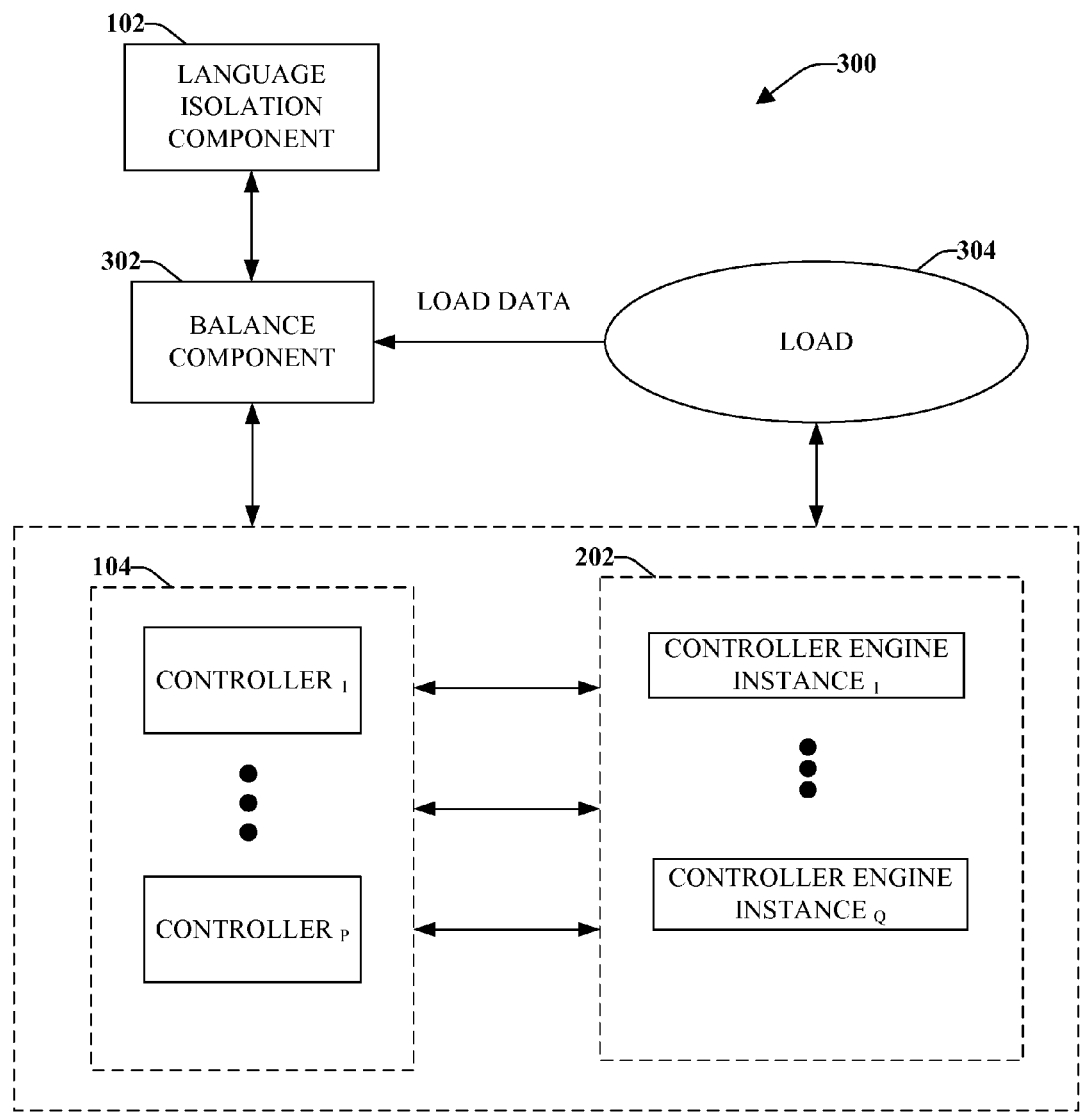
FIG. 3 illustrates a block diagram of an exemplary system that facilitates dynamically distributing a load amongst a plurality of controllers and/or a plurality of controller engine instances and grouping such controllers and/or controller engine instances.

FIG. 3 illustrates a system 300 that facilitates dynamically distributing a load amongst a plurality of controllers and/or a plurality of controller engine instances and grouping such controllers and/or controller engine instances. The system 300 can include a balance component 302 that can employ dynamic allocation of a portion of a load 304 to one or more controllers 104 and/or one or more controller engine instances 202 without user intervention. Generally, the balance component 302 can adjust a load assignment (e.g., load A is assigned to controller X, load B is assigned to controller Y, etc.) for controllers 104 (and respective controller engine instances 202) within an industrial automation environment without user intervention. Moreover, the balance component 302 can allow the distribution of most any suitable portion of the load 304 to most any suitable portion of the controllers 104 or most any suitable portion of controller engine instances 202. The examples and illustrations below associated with dynamic load distribution is intended to include distribution to a controller as well as distribution to a controller engine instance and the claimed subject matter is to include most any suitable combination of employing a controller and/or a controller engine instance.

For example, the load 304 can be partitioned into five (5) parts with five (5) controllers handling/controlling each part. In another example, the load 304 can be divided into four (4) pieces where a controller A can handle/control 2 pieces, controller B can handle/control 1 piece, and controller C can handle/control 1 piece. Still further, the load 304 can be divided into three (3) pieces where a host controller can include most any suitable number of controller engine instances that can handle/control the three (3) pieces accordingly (e.g., evenly distributed, percentage-based, processor-based percentage, resource availability-based, etc.). It is to be appreciated that the load 304 can be partitioned and/or distributed based on most any suitable manner such as, but not limited to, controller resources, controller engine instance resources, processor availability, processing capabilities, percentage based, functionality, importance, priority, security, location, source/origin, user preference, user-defined manner, relation to source code, etc. Furthermore, it is to be appreciated that the balance component 302 can distribute a portion of the load 304 to most any suitable number of controllers 104 such as controller $_1$ to controller $_P$, where P is a positive integer. Moreover, it is to be appreciated that the balance component 302 can distribute a portion of the load 304 to most any suitable number of controller engine instances 202 such as controller engine instance $_1$ to controller engine instance $_Q$, where Q is a positive integer regardless of the host controller (e.g., remote, local, resources, processing capabilities, etc.). Although a single balance component 302 is depicted, it is to be appreciated and understood that most any suitable number of balance components can be employed such that the balance component can be within each controller, a stand-alone component, and/or most any suitable combination thereof.

By evaluating at least one of the load 304 and/or the controllers 104, the balance component 302 can enable self-tuning and/or dynamic distribution which optimizes and enhances controllers within industrial automation environments. Controllers within industrial automation environments typically have various characteristics and/or capabilities in relation to computation and/or processing ability. By evaluating such characteristics and/or the load 304, the system 300 greatly improves traditional techniques and/or mechanisms associated with controllers. It is to be appreciated that the load 304 can be most any suitable load related to an industrial environment such as, but not limited to, control related to a portion of a device within the industrial environment, control related to a portion of a process within the industrial environment, receipt of data related to the industrial environment, transmission of data related to the industrial environment, most any suitable processing within the industrial environment, etc. For instance, the balance component 302 can monitor and/or track most any suitable characteristic associated with the capability of the controllers 104 such as, but not limited to, processing ability, hard drive, processor speed, memory, networking capabilities, version, edition, hardware age, processor type, controller brand, controller functionality, controller make, controller model, available resources, capacity available, accessibility, frequency of use, processor consumption, memory consumption, controller embedded software (e.g., firmware), etc.

Furthermore, it is to be appreciated that communication between most any suitable controllers (and/or controller engine instances 202) handling/controlling a portion of the load 304 can be employed. Thus, the controllers 104 and/or controller engine instances 202 can communicate to each other in relation to the distribution of the load 304 therewith. Moreover, it is to be understood that the communication can be among most any suitable controller and/or controller engine instance associated with the system 300 and the communication need not be between controllers sharing the load 304. Thus, a system can include controller A, controller B, and controller C such that a load is shared by controller A and controller B (e.g., no load on controller C, a disparate load on controller C, etc.). Controller C can communicate to controller A and/or controller B to notify of available processing resources/capabilities to which a portion of the load can then be shared by controller C. Furthermore, it is to be appreciated that the balance component 302 can receive such communications and re-distribute the allocation of the load 304 accordingly in real-time.

Additionally, the language isolation component 102 can allow an industrial environment to be organized in a granular manner based upon languages utilized and/or employed by entities (e.g., devices, data, processes, applications, controllers, controller engine instances, etc.). For example, the language isolation component 102 can group controller engine instances together to create a unit and/or group that are relate to a particular language and isolated from other units and/or groups utilizing disparate languages. Furthermore, the balance component 302 can distribute the load 304 to controller engine instances 202 based on languages (e.g., computer languages utilized, application languages utilized, programming languages utilized, compatible computer languages, compatible application languages, compatible programming languages, etc.), wherein the language isolation component 102 can implement such divisions and/or segments of controller engine instances 202 based on the languages which can include respective dedicated execution space for divisions/segments. For instance, the balance component 302 can distribute at least one load based on language, wherein the language isolation component 102 can create a partition/unit based on such language (e.g., unit A with loads that utilize language A within an industrial environment) and isolate such partition/unit from a partition/unit with a disparate language (e.g., unit B with loads that utilize language B within an industrial environment).

Figure 4:
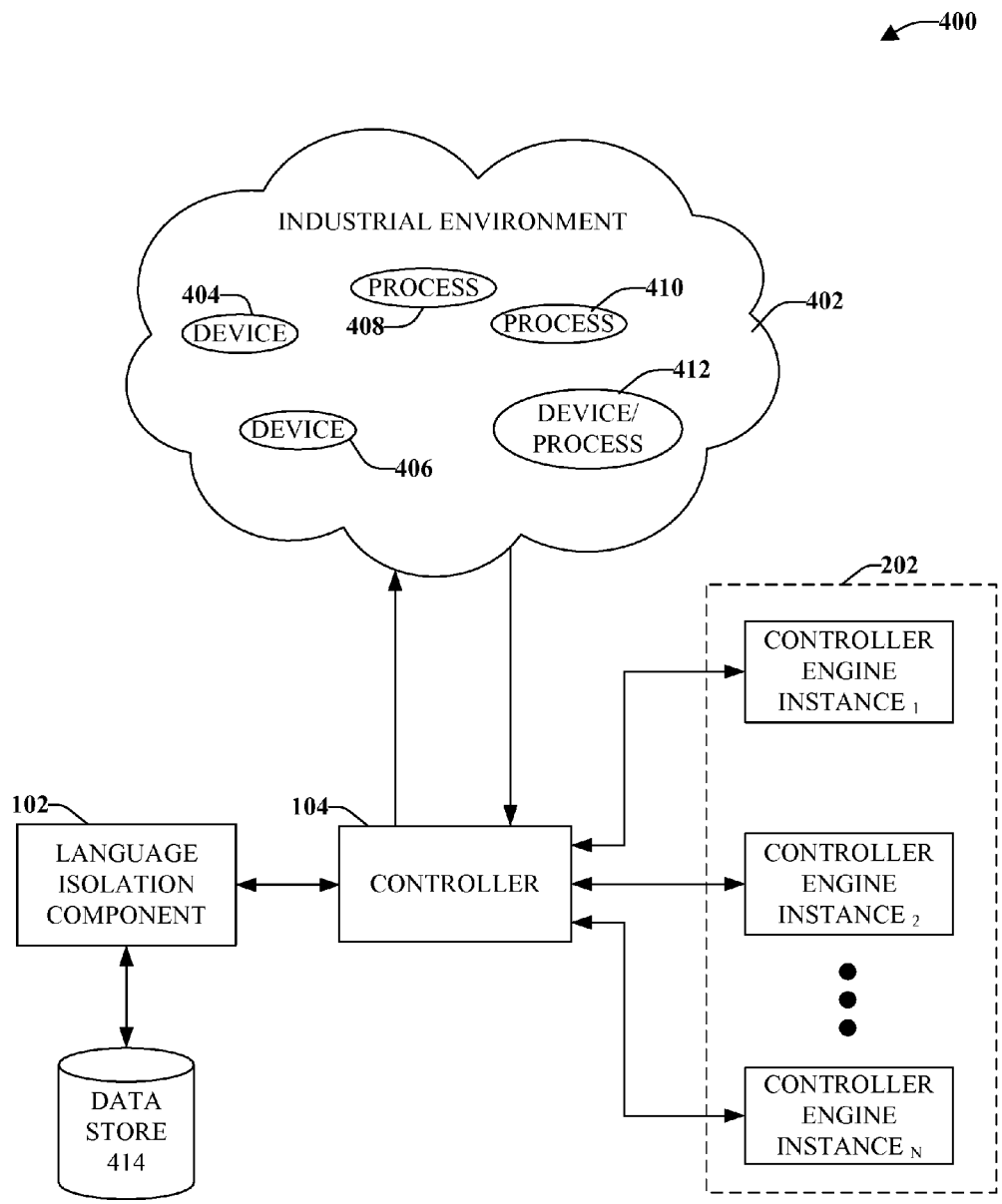
FIG. 4 illustrates a block diagram of an exemplary system that facilitates organizing an industrial environment and controller engine instances based on computer language.

FIG. 4 illustrates a system 400 that facilitates organizing an industrial environment and controller engine instances based on computer language. The language isolation component 102 can create at least one independent and distinct unit and/or partition within an industrial environment based on language employed and/or utilized by a controller engine instance and/or a load associated therewith. In general, the industrial environment 402 can include a plurality of controller engine instances, controllers, devices, processes, applications, data, etc. and each with corresponding languages. By organizing the industrial environment 402 into units/partitions with respective dedicated execution space, the language isolation component 102 allows the controller engine instances, controllers, devices, processes, applications, data, etc. to be more easily administrated without affecting more of the environment than what is necessary. For example, the industrial environment 402 can include most any suitable number of devices and/or process such as device 404, device 406, process 408, process 410, and/or device/process 412. It is to be appreciated that the devices and/or process within the industrial environment can be communicatively coupled to the system 400 by way of an intranet or other suitable network. Moreover, it is to be appreciated that the devices and/or processes within the network can communicate utilizing most any suitable technique (e.g., employing CIP but transmission of data can be accomplished using a technique not defined as a network). The device can be most any suitable device associated with an industrial automation environment such as, but not limited to, a physical device, a software device, an application, a virtual device, a PLC, a controller device, a furnace, a human machine interface (HMI), a computer, a disparate controller, a roller, a station, a welder, a scanner, a belt conveyor, a pump, a press, a fan, a heater, a switch, a sensor, a conveyor, a portion of firmware, a portion of an application, a portion of a process, a cooler, a valve, an electrical component, a drain, a photo eye, a robot, etc. Furthermore, the device and/or process can be controlled by the controller 104, at least one controller engine instance 202, a portion of a controller engine instance, and/or most any suitable combination thereof. It is to be appreciated that a controller can be executed as a component of a larger system can take part of the load sharing. For example, the controller can be executing as a component of the welder, wherein the controller may be capable of also interacting with the language isolation component 102.

It is to be appreciated that the system 400 can be utilized in a hierarchically structured industrial environment. For example, the devices/processes 404-412 can be hierarchically structured to facilitate management of such devices within the industrial environment 402. The hierarchy can be based at least in part upon the physical location of devices (e.g., a region of a factory can have several defined sub-regions, which in turn can comprise sub-regions), standards associated with industry, such as ISA S95, ISA S88, and the like, proprietary hierarchy that is provided by an enterprise, or any other suitable hierarchy. For instance, a top portion of the hierarchy may be a plant, and a sub-level of the plant may be programmable logic controllers utilized within the plant, and a sub-level of the programmable logic controllers can be devices controlled by such controllers (discussed in more detail in FIG. 10). It is understood that this is but one example of a hierarchy, and is for illustrative purposes only.

Moreover, the system 400 can include a data store 414 that can store most any suitable data related to the language isolation component 102, the controller 104, a controller engine instance 202, and/or most any suitable combination thereof. For example, the data store 414 can store language identification data, data identified with a particular language, language location data, language capabilities, languages utilized, languages available within an environment, data related to device language, data related to controller language, data related to controller engine instance language, language information based on environment-specific parameters, historic data related to the industrial environment, historic data related to controller engine instance, controller data, most any suitable data related to a controller and/or a controller engine instance, health data related to a controller, transfer data, distribution data, etc. The data store 414 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), MRAM, a combination of NV memory with the access speeds of volatile memory, and Rambus dynamic RAM (RDRAM). The data store 414 of the subject systems and methods is intended to comprise, without being limited to, these and any other suitable types of memory. In addition, it is to be appreciated that the data store 414 can be a server, a database, a hard drive, and the like.

Figure 5:
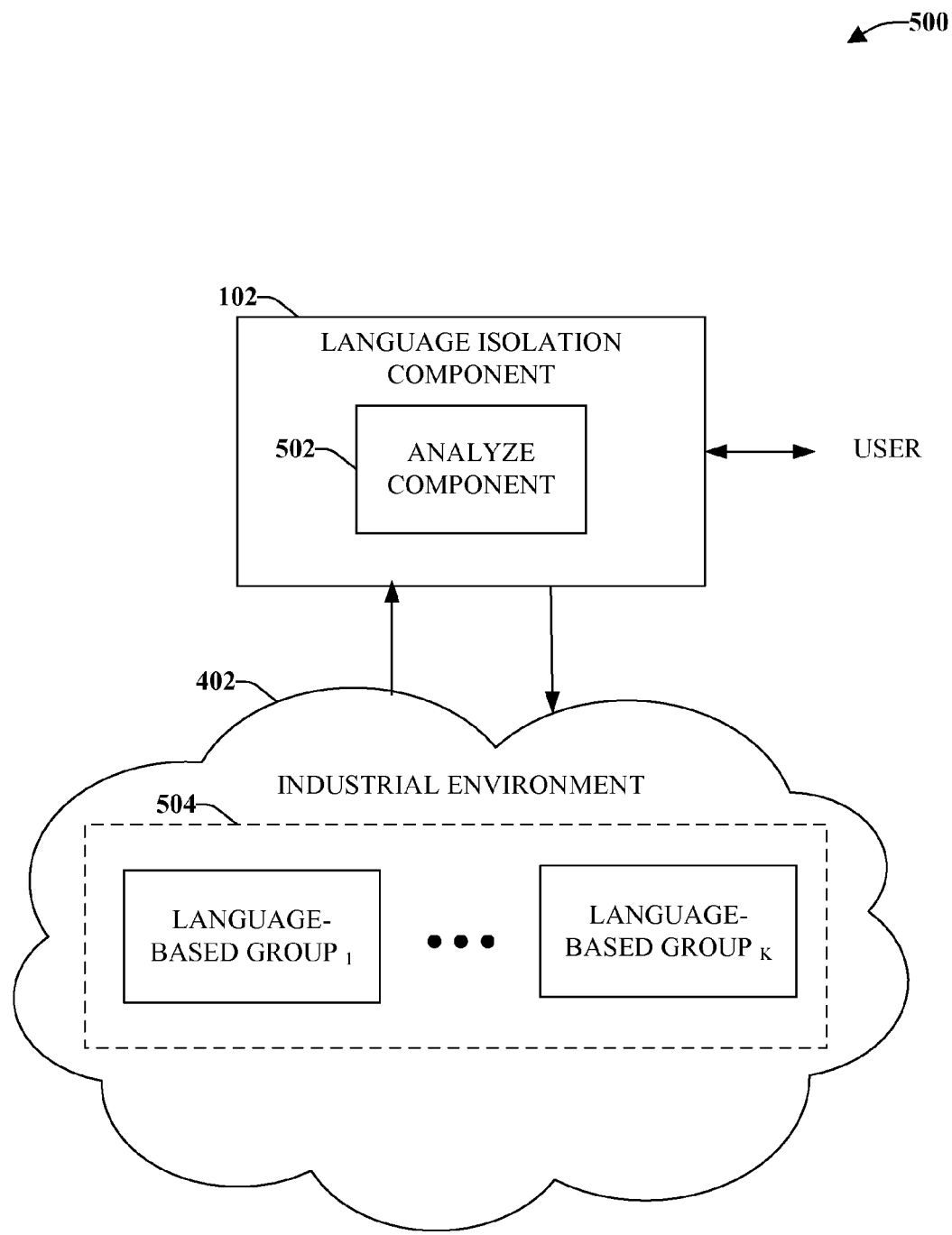
FIG. 5 illustrates a block diagram of an exemplary system that facilitates evaluating an industrial environment to organize controller engine instances based on computer language.

FIG. 5 illustrates a system 500 that facilitates evaluating an industrial environment to organize controller engine instances based on computer language. The system 500 can include the language isolation component 102 that enables a language-based division and/or grouping in which each division and/or group employs dedicated execution space that does not affect one another. In order to identify languages utilized within the industrial environment 402, the language isolation component 102 can include an analyze component 502. The analyze component 502 can monitor and/or examine the industrial environment 402 to discover languages utilized therewith. It is to be appreciated that the languages can be identified manually by a user (as depicted), a machine, a group, a facility, the Internet, a voting technique based on a portion of an industrial environment, etc. Moreover, upon identifying languages utilized, the analyze component 502 can ascertain the importance of such language within the industrial environment 402 based upon the controllers, controller engine instances, devices, processes, data, applications, etc. that implement such language.

The language isolation component 102 can further create and/or group the industrial environment 402 into most any suitable number of language-based groups 504 such as, language-based group $_1$ to language-based group $_K$, where K is a positive integer. For example, a first group can correlate to C programming language that includes controller A, controller instances 1, 2, 7, and 9 and most any suitable devices, loads, applications, processes, etc. Whereas a second group can include Ladder Logic programming language that includes controller B, controller C, controller D, controller engine instances 3, 4, 5, 6, 8, and 10 and most any suitable devices, loads, applications, processes, etc. Thus, the first group can be exclusive membership based on utilizing programming language C and the second ground can exclusive to Ladder Logic employment, wherein the first group and the second group can each include distinct and separate execution space (e.g., the first group is sandboxed and the second group is sandboxed independent of one another).

Figure 6:
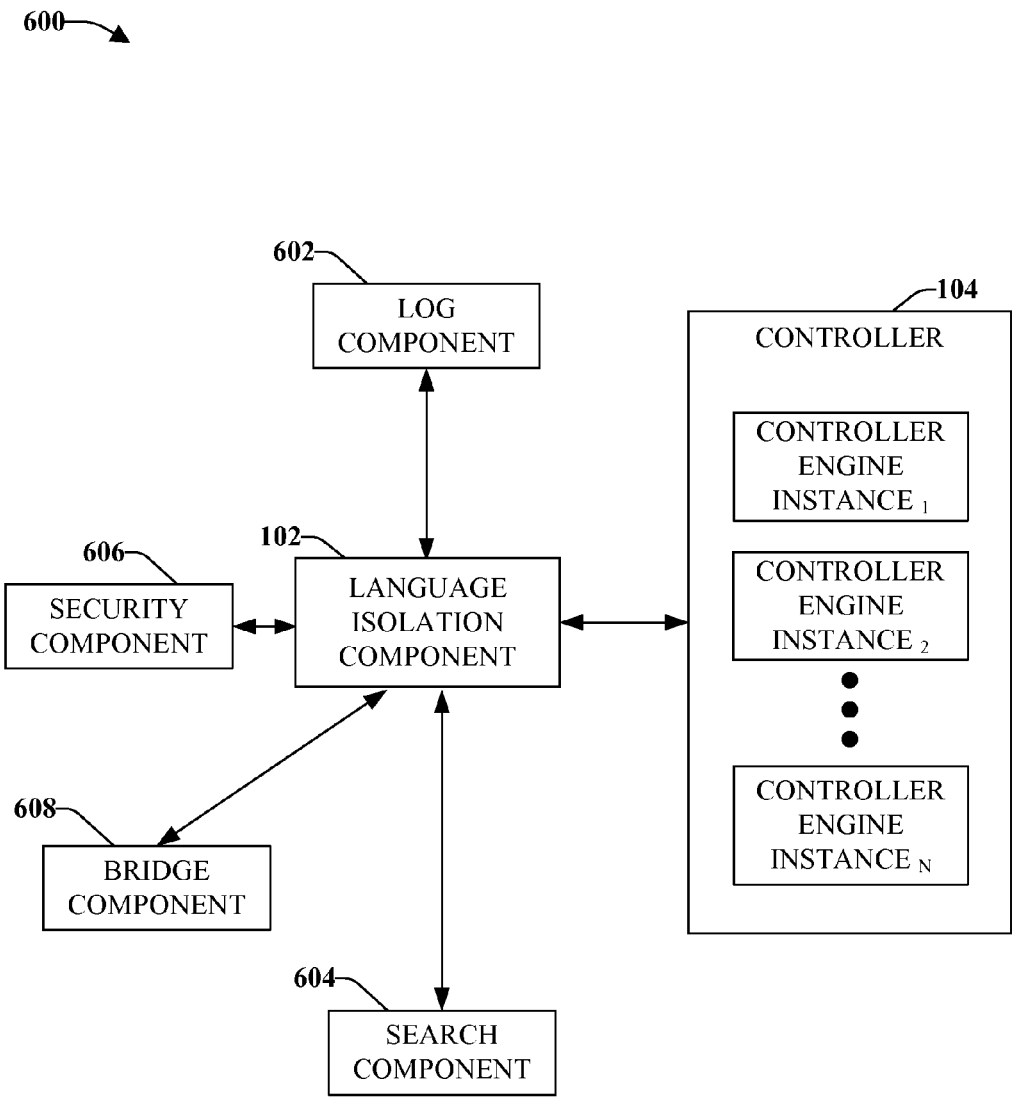
FIG. 6 illustrates a block diagram of an exemplary system that facilitates grouping controller engine instances based on computer languages associated therewith.

FIG. 6 illustrates a system 600 that facilitates grouping controller engine instances based on computer languages associated therewith. The system 600 can utilize a log component 602 that tracks data in accordance with the claimed subject matter. In particular, the log component 602 can track and/or monitor data related to languages identified, location of such languages, changes within an environment that can affect languages, user-defined language affiliations, language usage updates, language evaluation, segment data, segment membership data, trouble-shooting data, data analysis, user data related to the system 600, security data, hierarchy data, and/or most any suitable data related to the controller, controller engine instance, device, process, applications, code, etc. It is to be appreciated that the log component 602 can be a stand-alone component, incorporated into the language isolation component 102, incorporated into the controller 104, incorporated into a controller engine instance, and/or any combination thereof. For example, if a user identifies a first language for a first segment including controller engine instance A and a second language for a second segment including controller engine instance B, the log component 602 can track the user (e.g., via IP address, network address, user name, computer name, etc.), the date and time of segmenting, the date and time of language identification, details of the identification, details of the language, the reasoning for the segmentation, the controller hosting the controller engine instance, etc. Moreover, the log component 602 can store the logged entries in a data store (not shown).

The language isolation component 102 can further utilize a search component 604 that facilitates querying any data associated with the system 600. The search component 604 allows a user and/or any component to query the system 600 in relation to languages, language locations, language affiliation, languages utilized, segments, divisions, partitions, membership data, language identification data (e.g., user/ component that identifies the language, time, date, reasoning, etc.), controller engine instance data, controller data within the industrial environment, processes, devices, applications, portions of code, etc. For instance, a user can query the system 600 utilizing the search component 604 to find a language for a specific controller engine instance associated with a particular controller within the Localville, Ohio plant. In another example, the search component 604 can allow a developer/user/entity (e.g., a computer, a machine, a corporation, a group, an individual, a controller, etc.) to provide all variable names associated with devices within sector 5, cell 6, and controlled by controller engine instance C executing on controller A associated with a particular language. It is to be appreciated that a plurality of searches and/or queries can be implemented by the search component 604 and the above examples are not to be limiting on the claimed subject matter. Moreover, it is to be appreciated that the search component 604 is depicted as a stand-alone component, but the search component 604 can be incorporated into the language isolation component 102, incorporated into the controller 104, incorporated into a controller engine instance, a stand-alone component, and/or any combination thereof.

The language isolation component 102 can further utilize a security component 606 that provides security to the system 600 to ensure data integrity and/or access in connection with the language isolation component 102, the controller 104, a controller engine instance, the plurality of controller engine instances, and/or most any suitable combination thereof. In particular, the security component 606 can define security, authorization, and/or privileges in accordance with at least one of a pre-defined hierarchy, security level, username, password, access rights, data importance (e.g., more important data correlates with high security clearance), etc. For instance, a particular language-based partition related to a controller engine instance can be a first security level with distinct security authorizations and/or privileges, while a disparate language-based partition related to a disparate controller engine instance can have a second security level with disparate security authorizations and/or privileges. Thus, the security component 606 can provide granular security and/or privileges in relation to segments, partitions, divisions, language identified, languages, controller engine instance execution space, controllers, controller engine instances, applications, processes, devices, etc. It is to be appreciated that there can be various levels of security with numerous characteristics associated with each level and that the subject innovation is not limited to the above example. It is to be appreciated that security component 606 can be a stand-alone component, incorporated into the language isolation component 102, incorporated into the controller 104, incorporated into a controller engine instance, and/or any combination thereof.

The language isolation component 102 can further include a bridge component 608 that facilitates networking within an industrial automation environment. In other words, the bridge component 608 can act as a network bridge. It is to be appreciated that the bridge component 608 can be a stand-alone component, incorporated into the language isolation component 102, incorporated into the controller 104, incorporated into a controller engine instance, and/or any combination thereof. Thus, data carried by disparate networks can be manipulated so that it conforms to a common network. Accordingly, the bridge component 608 can recognize a network protocol associated with received instructions related to the language isolation component 102 and perform operations to convert such data so that it conforms to a pre-defined protocol. Upon such conversion, a mapping can be employed to convert the data so that it conforms to a hierarchically structured data model (rather than data models associated with flat namespaces). The mapping can thereafter provide hierarchically structured data to a requester of such data over a network, wherein the network conforms to the pre-defined protocol. For instance, the first network protocol can be at least one of Fieldbus, Profibus, Hart, Modbus, ASI-bus, and Foundation Fieldbus, while the second network protocol can be a Common Industrial Protocol (CIP). It is to be appreciated that the first network protocol and the second protocol can be both CIP or one be Hart and one be ASI-Bus.

Figure 7:
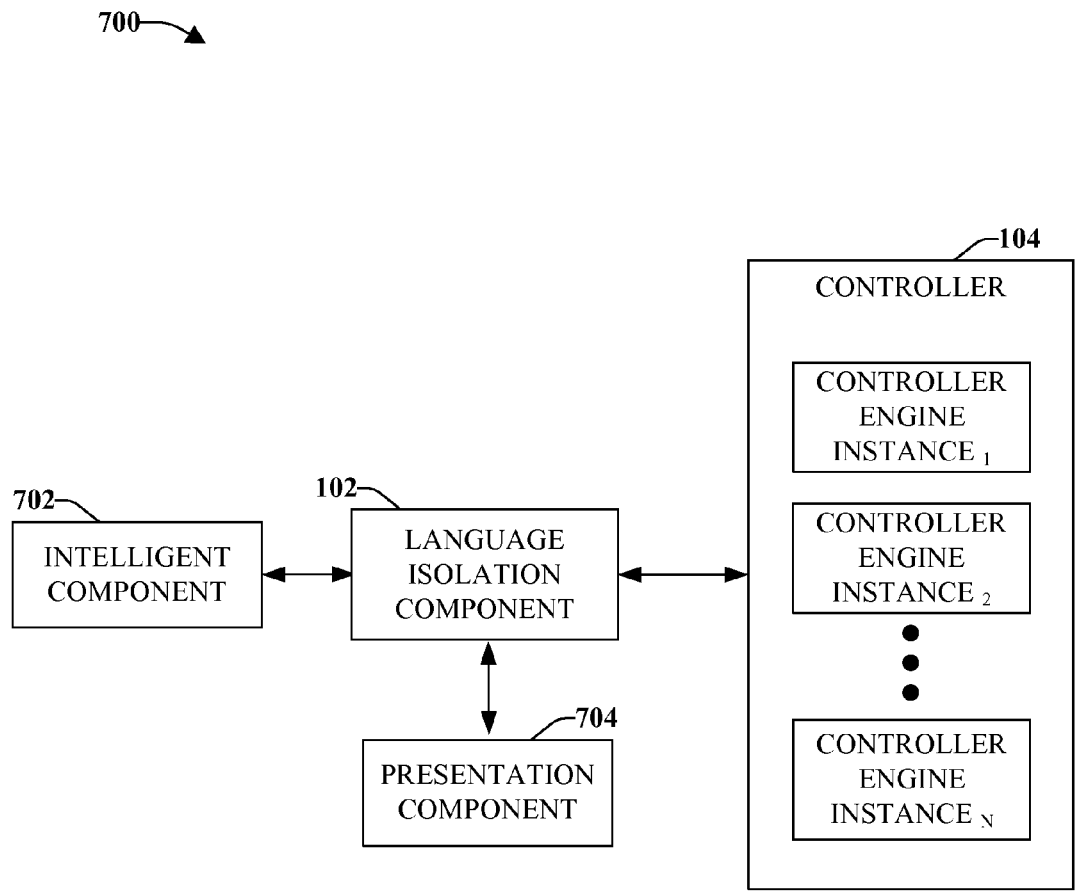
FIG. 7 illustrates a block diagram of an exemplary system that facilitates organizing an industrial environment and controller engine instances based on computer languages.

FIG. 7 illustrates a system 700 that employs intelligence to facilitate organizing an industrial environment and controller engine instances based on computer languages. The system 700 can include the language isolation component 102 and the controller 104 with two or more controller engine instances that can all be substantially similar to respective controllers, instances, and components described in previous figures. The system 700 further includes an intelligent component 702. The intelligent component 702 can be utilized by the language isolation component 102 to facilitate segmenting an industrial environment into groups, collections, divisions, partitions, and the like based upon a computer language, application language, programming language, etc. utilized therewith. For example, the intelligent component 702 can infer a language, a language capability, language-based segmenting, language hierarchy based on importance, a division, a grouping, a partition, a hierarchical ranking of controller engine instances and/or languages, etc.

It is to be understood that the intelligent component 702 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, intelligent agents, and probabilistic classification models providing different patterns of independence can be employed.

Classification as used herein also is inclusive of statistical regression that is utilized to develop models of priority.

A presentation component 704 can provide various types of user interfaces to facilitate interaction between a user and any component coupled to at least one of the language isolation component 102, the controller 104, and/or a controller engine instance. As depicted, the presentation component 704 is a separate entity that can be utilized with language isolation component 102. However, it is to be appreciated that the presentation component 704 and/or similar view components can be incorporated into the language isolation component 102, a stand-alone unit, and/or most any suitable combination thereof. The presentation component 704 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to the language isolation component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels. It is to be further appreciated that the presentation component 704 can utilize bio sensing, biometrics (e.g., fingerprints, retina scan, iris scan, facial patters, hand measurement, etc.), and the like. Moreover, the presentation component 704 can present data to a non-human interfaces such as other machines.

Figure 8:
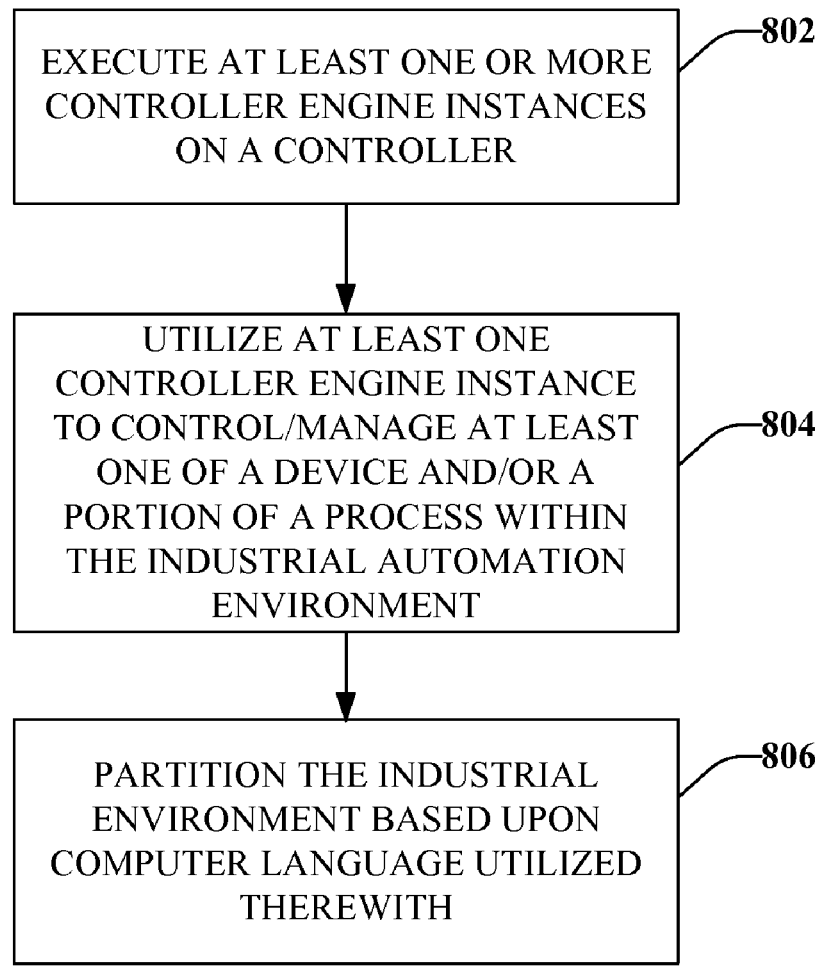
FIG. 8 illustrates an exemplary methodology for organizing an industrial environment and controller engine instances based at least in part upon a computer language.
Figure 9:
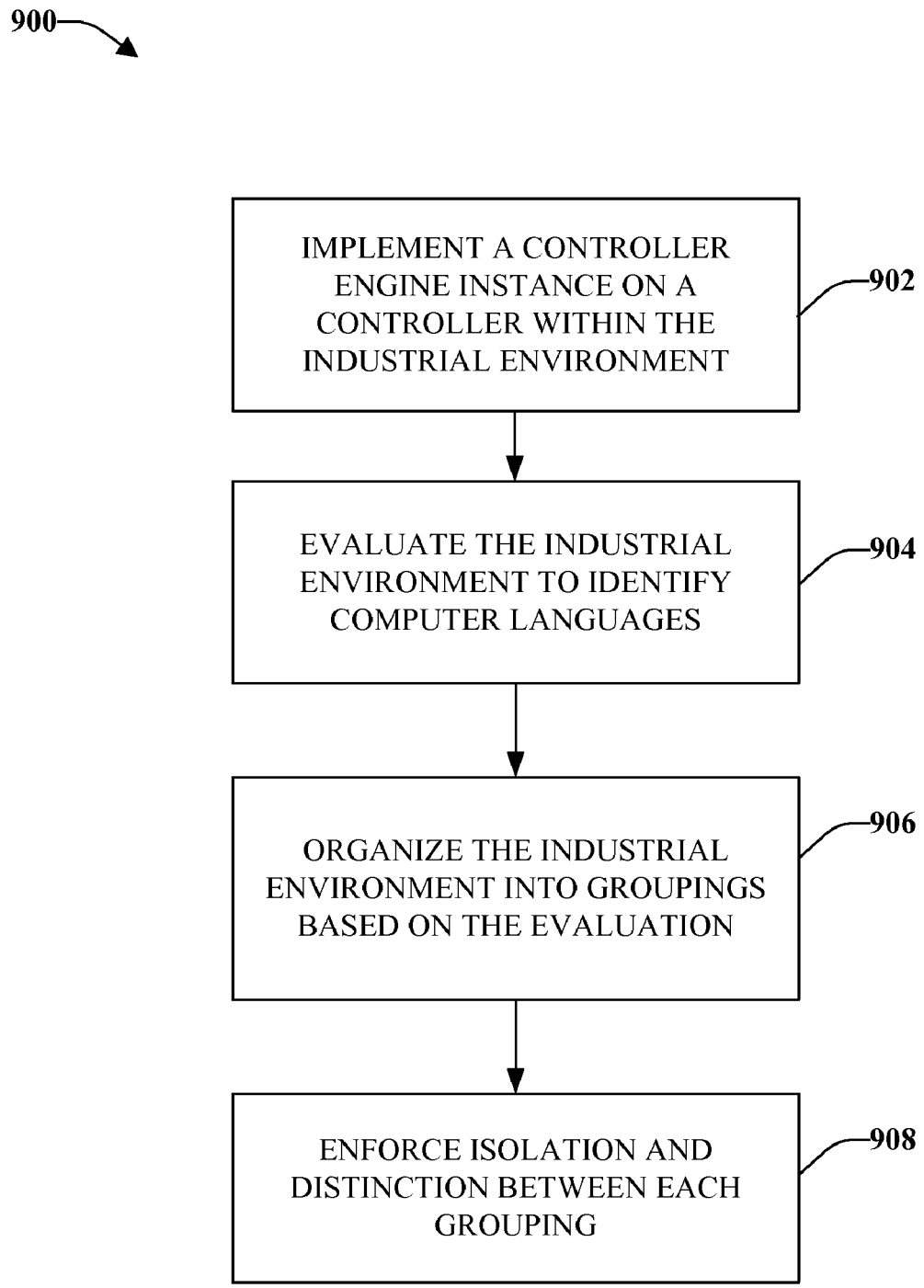
FIG. 9 illustrates an exemplary methodology that facilitates evaluating an industrial environment to identify computer languages to associate controller engine instances.

Referring to FIGS. 8-9, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 8 illustrates a methodology 800 for organizing an industrial environment and controller engine instances based at least in part upon a computer language. At reference numeral 802, at least one or more controller engine instances can be executed on a controller within an industrial automation environment. The controller can have a real time operating system (OS), wherein such controller can be employed in an industrial automation environment. It is to be appreciated that the controller can contain software components and hardware components having inputs and/or outputs that can be utilized in connection with automating an industrial manufacturing device/process within the industrial automation environment. Moreover, it is to be appreciated and understood that the controller can be most any suitable portion of hardware and/or portion of software that receives and/or transmits inputs and/or outputs in order to control at least one of a device or a portion of a process. It is to be noted that a controller (e.g., a programmable logic controller (PLC), etc.) can be a dedicated piece of hardware that is self contained or in the case of a "soft PLC" a piece of software that runs on a computer and provides PLC-like control.

Furthermore, the controller can utilize most any suitable number of controller engine instances such as controller engine instance $_1$ to controller engine instance $_N$, where N is a positive integer. Moreover, the claimed subject matter implements a controller engine instance in a substantially similar manner to a process implemented on a hardware controller in the fact that multiple controller engines (e.g., controller engine instance) can execute on the hardware controller (e.g., multiple processes can execute on a controller). It is to be appreciated that the one or more controller engine instances can be executed without user intervention (e.g., in an automatic and seamless manner without human assistance). At reference numeral 804, at least one controller engine instance can be utilized to control and/or manage at least one of a device or a portion of a process within the industrial automation environment. It is to be appreciated that some controller engine instances may be a pure computational engine (e.g., control modules that compute gas flow, etc.) and may not control any devices. In other words, the controller can implement a plurality of controller engine instances, wherein each controller engine instance can handle controlling a device and/or portion of a process within an industrial automation environment.

At reference numeral 806, the industrial environment can be partitioned based upon computer language utilized therewith. The industrial environment can be selectively divided into various sectors, sections, partitions, units, etc., wherein each can include various loads, controllers, controller engine instances, processes, devices, and the like. The partitioning of the industrial environment can be based at least in part upon computer language, application language, programming language, language capabilities, languages utilized by controller engine instances, etc. By partitioning the industrial environment into language-based groups, the environment can be administrated and/or managed in a more efficient incremental manner rather than in its entirety.

FIG. 9 illustrates a methodology 900 that facilitates evaluating an industrial environment to identify computer languages to associate with controller engine instances. At reference numeral 902, a controller engine instance can be implemented on a controller within an industrial environment. The industrial environment (e.g., an industrial environment, an automation environment, an environment, an automation industry, etc.) can employ a hierarchical representation of devices and/or processes. The hierarchy can be based at least in part upon the physical location of devices/processes (e.g., a region of a factory can have several defined sub-regions, which in turn can comprise sub-regions), standards associated with industry, such as ISA S95, ISA S88, and the like, proprietary hierarchy that is provided by an enterprise, or any other suitable hierarchy.

At reference numeral 904, the industrial environment can be evaluated to identify computer languages. For example, entities (e.g., controllers, data, code, applications, controller engine instances, devices, hardware components, software components, processes, etc.) within the industrial environment can be evaluated to identify languages utilized therewith. For example, most any suitable language (e.g., high level language, low level language, execution blocks, assembly code, machine instructions, etc.) can be identified within the industrial environment such as, but not limited to, C, C+, C++, C#, ADA, PASCAL, FORTRAN, BASIC, Visual Basic, LISP, PROLOG, JAVA, Assembly Programming Language, ALGOL, COBOL, Ladder Logic, Function Blocks, Sequential Function Charts, Structured Text, Instruction Lists, native controller language, Python, a scripting language, a specification language (e.g., formal specification, language-independent specification, etc.), a query language (SQL, XQuery, etc.), a markup language (HTML, etc.), a transformation language (e.g., XSLT, etc.), a template processing language, a fourth-generation programming language (e.g., 4GL, etc.), a hardware description language, a configuration file format (e.g., INI file, etc.), a data serialization format, etc.

At reference numeral 906, the industrial environment can be organized into at least two or more groups based at least in part upon the evaluation related to degree computer languages, application languages, programming languages, etc. For example, an industrial environment can be evaluated to identify three languages (e.g., language 1, language 2, and language 3), wherein entities related to such languages can be grouped and/or partitioned together. Specifically, the controller engine instances within the industrial environment can be grouped accordingly based on such languages. It is to be appreciated that there can be most any suitable number of languages or group of languages and the above example is solely for illustration. At reference numeral 908, isolation and distinction between each grouping can be enforced. For example, each segment and/or partition (e.g., created based upon languages) can be sand-boxed from one another such that each includes dedicated and distinct execution space so as not to affect one another.

Figure 10:
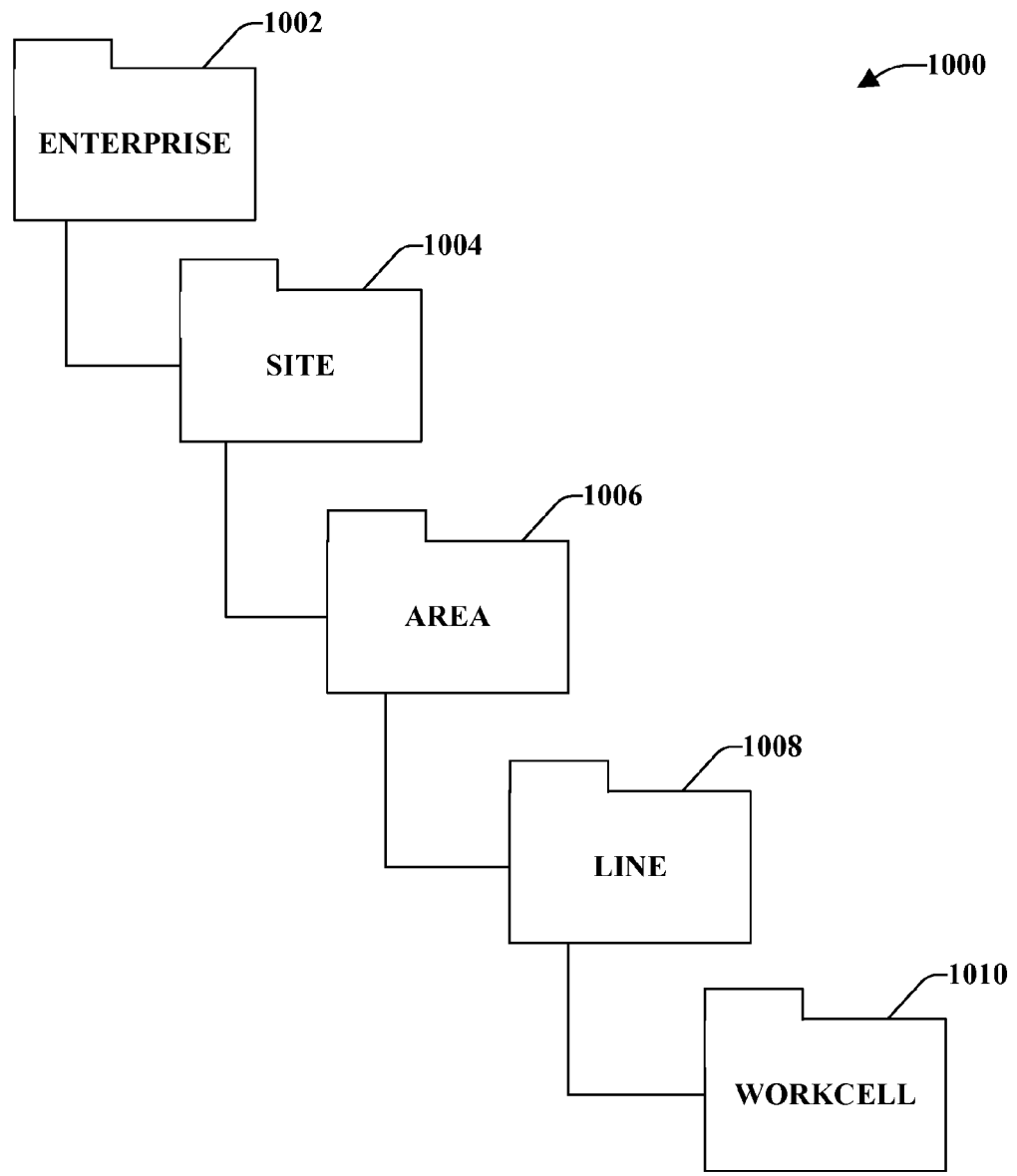
FIG. 10 illustrates a block diagram of an exemplary data structure that represents a hierarchical structure of an industrial automation system.

Referring now to FIG. 10, an exemplary hierarchical structure 1000 which can be utilized in connection with the hierarchically structured data model (e.g., hierarchical representation of devices, processes, etc.) alluded to herein is illustrated. For example, the data model can facilitate utilizing nested structures, thereby mitigating deficiencies associated with data models that employ flat namespaces. The structure 1000 includes an enterprise level 1002, where a particular enterprise can be represented within data structured in accordance with a hierarchical data model. Beneath the enterprise level 1002 can be a site level 1004, so that a particular factory (site) within an enterprise can be represented within a data packet. Beneath the site level 1004 an area level 1006 can exist, which specifies an area within the factory that relates to the data. A line level 1008 can lie beneath the area level 1006, wherein the line level 1008 is indicative of a line associated with particular data. Beneath the line level 1008 a workcell level 1010 can exist, thereby indicating a workcell associated with the data. Utilizing a nested, hierarchical data model, PLCs can become more aware of data associated therewith. Furthermore, the hierarchy 1000 can be customized by an owner of such hierarchy. For instance, more granular objects/levels can be defined within the hierarchy 1000 in relation to the various assets associated therewith. It is to be appreciated that the structure 1000 is for exemplary purposes only and a plurality of levels can be implemented with a multitude of entities can be employed.

Figure 11:
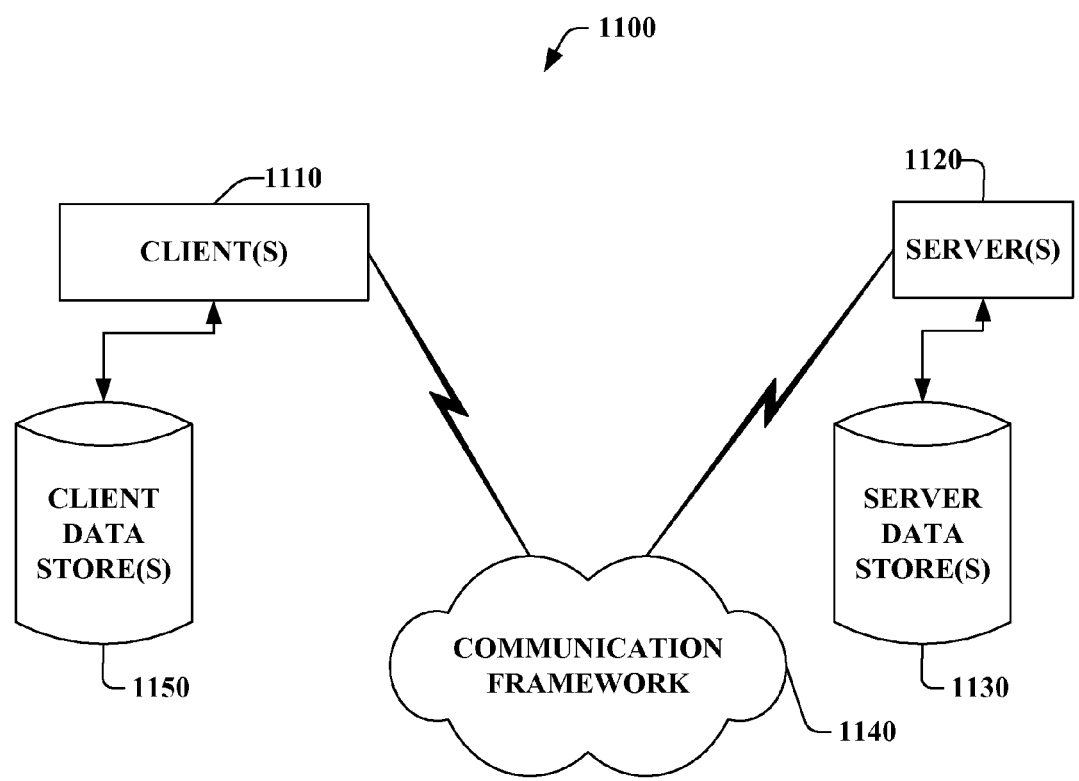
FIG. 11 is an exemplary computing environment that can be utilized in connection with the claimed subject matter.
Figure 12:
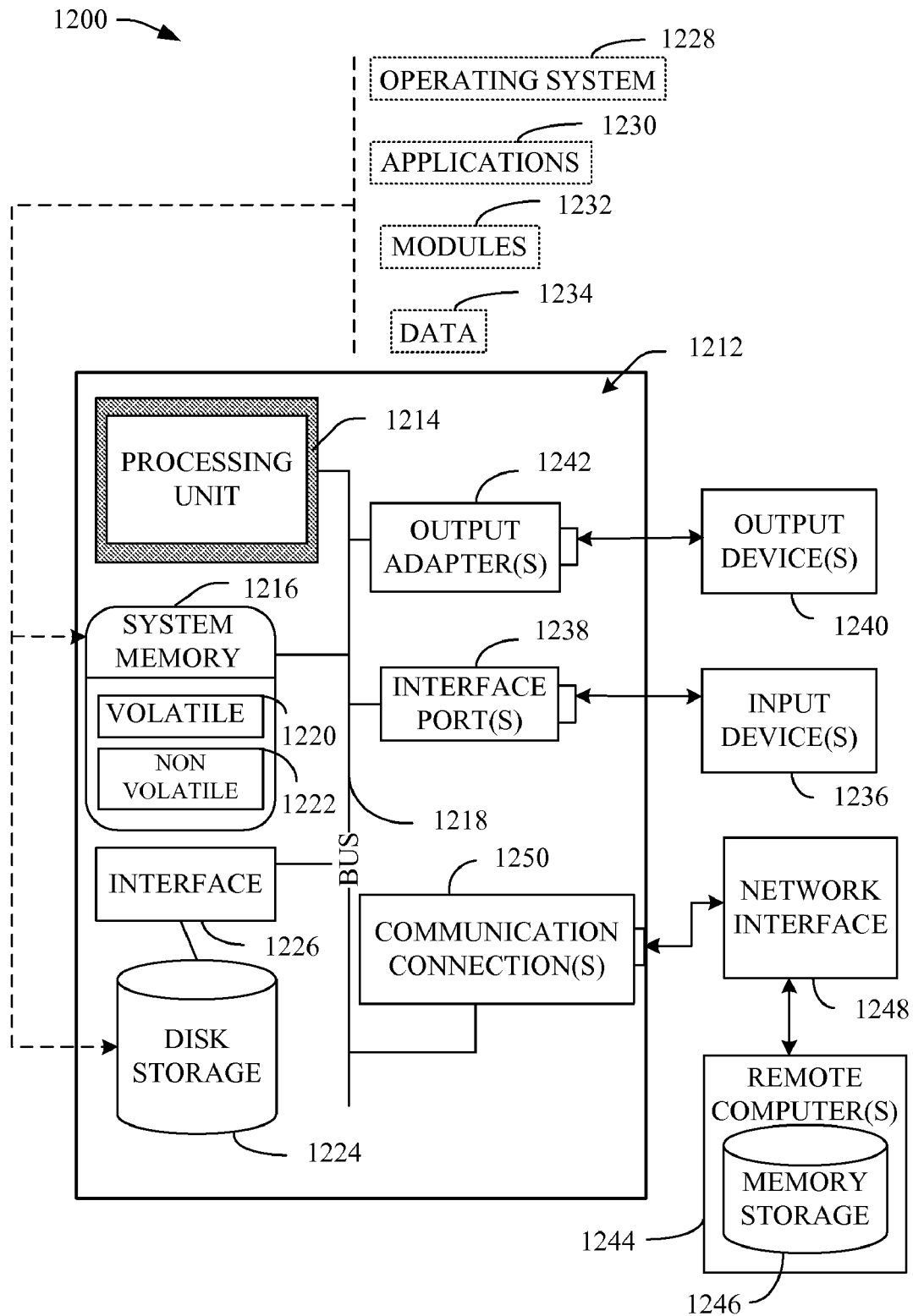
FIG. 12 is an exemplary networking environment that can be utilized in connection with the claimed subject matter.

In order to provide additional context for implementing various aspects of the claimed subject matter, FIGS. 11-12 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 11 is a schematic block diagram of a sample-computing environment 1100 with which the claimed subject matter can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads to perform transformations by employing the subject innovation, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the servers 1120.

With reference to FIG. 12, an exemplary environment 1200 for implementing various aspects of the claimed subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchronous-link DRAM (SLDRAM), Rambus direct RAM (RDRAM), direct Rambus dynamic RAM (DRDRAM), MRAM, and Rambus dynamic RAM (RDRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the claimed subject matter can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates utilizing multiple computer languages within an industrial environment, comprising:
   at least two controllers associated with an industrial environment, comprising:
      a processor in one of the at least two controllers that generates at least two controller engine instances and executes the at least two controller engine instances wherein the at least two controller engine instances execute control programs for at least two disparate language-based groups within the industrial environment;
      a memory that stores that at least two controller engine instances, wherein at least one of the at least two controller engine instances is shared between the at least two controllers;
   wherein at least one of the least two controller engine instances is a distributed controller engine instance that concurrently executes on at least a portion of the at least two controllers; and
   a language isolation component that partitions data transmitted to the at least two controllers into the at least two language-based groups, wherein the at least two language-based groups are partitioned based at least in part upon at least two disparate computer languages.

2. The system of claim 1, further comprising an analyze component that identifies the at least two disparate computer languages within the industrial environment.

3. The system of claim 1, wherein the language isolation component enables at least one of a manipulation or an approval of at least one process to determine membership in the at least two language-based groups.

4. The system of claim 1, wherein at least one of the at least two language-based groups is based upon a computer language associated with a hierarchical representation of devices.

5. The system of claim 4, wherein the hierarchical representation of devices is based at least in part upon at least one of a proprietary standard or an industry standard, comprising at least one of International Society of Automation (ISA) S95, or ISA S88.

6. The system of claim 1, further comprising a security component that defines at least one of a security level, an authorization, or a privilege that corresponds to at least one of the at least two controller engine instances.

7. The system of claim 1, further comprising a search component that facilitates querying data associated with at least one of the at least two controller engine instances.

8. The system of claim 1, further comprising a log component that tracks data related to at least one of the at least two controller engine instances or the computer language.

9. The system of claim 1, further comprising a bridge component that provides a first network protocol utilized to carry data from the language isolation component and configures the data for transmittal over a second network protocol.

10. The system of claim 9, wherein the bridge component bridges multiple communication networks.

11. The system of claim 9, wherein the first network protocol is one of Common Industrial Protocol (CIP), Fieldbus, Profibus, Hart, Modbus, ASI-bus, or Foundation Fieldbus.

12. The system of claim 11, wherein the second network protocol is at least one of Common Industrial Protocol (CIP), Fieldbus, Profibus, Hart, Modbus, ASI-bus, or Foundation Fieldbus.

13. A method that facilitates isolating multiple computer languages from one another in an industrial environment, comprising:
   employing at least two controllers with a real time operating system in an industrial environment;
   evaluating the industrial environment to identify at least two computer languages;
   partitioning data from devices in the industrial environment into at least two language-based groups based at least in part upon at least two computer languages;
   executing two or more controller engine instances as processes on the at least two controllers, wherein the two or more controller engine instances execute control programs for the two or more language-based groups, wherein at least one of the two or more controller engine instances is shared and concurrently executes on a least a portion of the at least two controllers.

14. At least one controller that facilitates utilizing multiple computer languages within an industrial environment, comprising:
   a memory; and
   a processor, operatively coupled to the memory, the processor configured to:
      partition data from devices in the industrial environment into at least two language-based groups associated with at least two computer languages;
      execute at least two controller engine instances as processes on the controller, wherein the at least two controller engine instances execute control programs for the at least two language based groups, wherein at least one of the at least two controller engine instances is shared and concurrently executed on a least a portion of the at least one controller and a second controller.

* * * * *